United States Patent Office 3,158,602
Patented Nov. 24, 1964

3,158,602
METHODS OF PREPARING 3-ALKYLENEDIOXY
$\Delta^4$ STEROIDS AND PRODUCTS RESULTING
THEREFROM
John J. Brown, Pearl River, N.Y., Robert H. Lenhard,
Ridgefield Park, N.J., and Seymour Bernstein, New
City, N.Y., assignors to American Cyanamid Company, New York, N.Y., a corporation of Maine
No Drawing. Filed Mar. 2, 1962, Ser. No. 176,910
18 Claims. (Cl. 260—239.55)

This invention relates to a method of preparing steroidal ethylene ketals. More particularly, it relates to the novel method of preparing $\Delta^4$-3-ethylenedioxy steroids and new products resulting therefrom.

The process of the present invention can be illustrated by the following equation:

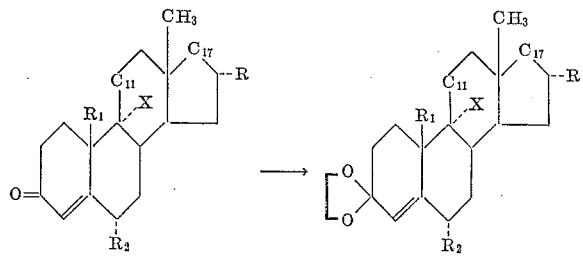

wherein R is hydrogen, hydroxyl, lower alkanoyloxy or a methyl radical, $R_1$ and $R_2$ are hydrogen or a methyl radical, X is a halogen atom,

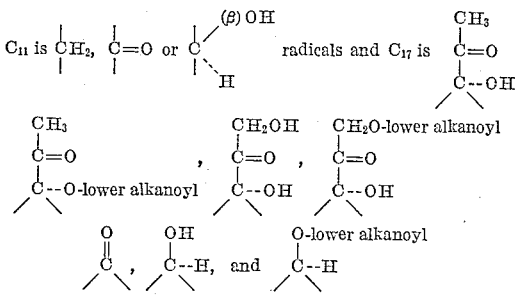

In the past, ketalization of certain $\Delta^4$-3-keto steroids with ethylene glycol using p-toluenesulfonic acid as a catalyst were known to produce $\Delta^5$-3-ethylenedioxy steroids. We have found that when a weaker acid is substituted for p-toluenesulfonic acid as catalyst, an acid having a pKa within the range of about 1 to about 5, $\Delta^4$-3-ethylenedioxy steroids are formed. When acids are used having pKa values within the range 1 to 5 and close to 1, then a mixture of $\Delta^4$-3-ethylenedioxy steroids and $\Delta^5$-3-ethylenedioxy steroids ordinarily results; when, however, acids are used having pKa values within the range 1 to 5 and close to 5, then the yield is ordinarily exclusively $\Delta^4$-3-ethylenedioxy steroids.

The $\Delta^4$-3-ketals of this invention may be prepared by contacting an appropriate $\Delta^4$-3-keto steroid with ethylene glycol in the presence of an acid having a pKa value ranging from 1 to 5. Ordinarily a water-immiscible solvent is used such as toluene, benzene, ethylene chloride or the like so that water formed during ketalization may be removed conveniently, such as by means of a Dean-Stark moisture trap, Soxhlet apparatus or the like. The ketalization is conveniently carried out at temperatures at which the reaction mixture is refluxing—say, 55°–130° C., or higher, depending upon solvent and reactants—and over a period of time ranging from 1 to 24 hours or so. The $\Delta^4$-3-ketal product may be recovered from the reaction mixture by conventional means.

Acids within the pKa range of 1 to 5 which have been found useful in the process of this invention are oxalic acid and adipic acid. Other acids having pKa values within the range 1 to 5 and which also therefore may be used in the process of this invention are benzoic acid, cinnamic acid, phenylacetic acid, salicyclic acid, malonic acid, succinic acid, glutaric acid, pimelic acid and the like.

A number of the compounds prepared by the process of the present invention are new and these may be illustrated by the following structural formula:

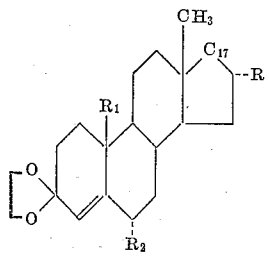

wherein R, $R_1$, $R_2$ and $C_{17}$ are as hereinbefore defined.

The new compounds of this invention are, in general, crystalline solids, relatively insoluble in water, but relatively soluble in solvents such as lower alkyl alkanols, ethyl acetate, tetrahydrofuran, acetone and the like.

The present compounds are useful as intermediates for preparing 4-substituted steroids. For example, progesterone can be converted into the $\Delta^4$-3,20-bisketal of progesterone by heating with ethylene glycol which can be converted into 3,20-bisethylenedioxypregnane-4,5-diol by reaction with osmium tetroxide in pyridine. The latter compound on treatment with formic acid produces the active progestational agent, 4-hydroxy progesterone. The $\Delta^4$-3-ethylene ketals of the present invention are physiologically active and useful in the treatment of a variety of disorders. For example, the compound 16$a$,21-diacetoxy-3-ethylenedioxy-9$\alpha$ - fluoro-11$\beta$,17$\alpha$-dihydroxypregn-4-en-20-one is active as an inflammatory agent and thereby useful in the treatment of arthritic and collagen diseases. Moreover, the present process is useful particularly with 21-hydroxylated steroids since they may be ketalized in the 3-position without having to protect the 21-hydroxyl group by acylation. By the present process 11-hydroxylated steroids may be 3-ketalized which had not been possible heretofore. Thus, hydrocortisone and hydrocortisone acetate may be ketalized by the process of the present invention.

The following examples describe in detail the process and products representative of the present invention.

EXAMPLE 1

Preparation of 3-Ethylenedioxy-17$\alpha$,21-Dihydroxypregn-
4-En-20-One

A mixture of 2.0 g. of Reichstein's Substance S, 6.0 ml. of ethylene glycol, 200 mg. of adipic acid and 100 ml. of benzene is stirred and heated under reflux conditions overnight (17–24 hours). The water formed during the reaction is removed by a Dean-Stark moisture trap. The cooled reaction mixture is diluted with benzene and washed with saturated aqueous sodium bicarbonate solution. The aqueous phase is extracted with benzene and the combined extracts are washed with water and filtered through a small pad of diatomaceous earth. The benzene is then evaporated under reduced pressure without preliminary drying and the residual glass which crystallizes upon the addition of ether is crystallized from acetone petroleum-ether containing a trace of pyridine to give 1.67 g. of 3-ethylenedioxy-17$\alpha$,21-dihydroxypregn-4-en-20-one, melting point 186–196° C. Three further crystallizations give 960 mg. of an analytical sample, melting point 192–196° C. with effervescence, $[\alpha]_D + 127°$ (1% pyridine in chloroform).

EXAMPLE 2

*Preparation of 3-Ethylenedioxy-17α,21-Dihydroxypregn-5-En-20-One*

A mixture of 2.0 g. of Reichstein's Substance S, 6.0 ml. of ethylene glycol, 200 mg. of oxalic acid and 100 ml. of benzene is stirred and heated under reflux conditions for a period of 17–24 hours. The water formed during the reaction is removed by a Dean-Stark moisture trap. The cooled reaction mixture is diluted with benzene and washed with a saturated aqueous solution of sodium bicarbonate. The aqueous phase is extracted with benzene and the combined extracts are washed with water and filtered through diatomaceous earth and dried with sodium sulfate. The solid obtained by evaporation of the solvent is collected with the aid of ether and crystallized from acetone to give 3-ethylenedioxy-17α,21-dihydroxypregn-5-en-20-one as plates, melting point 220–225° C. An analytical sample has a melting point of 227–228° C., $[\alpha]_D -20°$ (chloroform).

The acetate 21-acetoxy-3-ethylenedioxy-17α-hydroxypregn-5-en-20-one has a melting point of 264–268° C. and is undepressed with mixing with an authentic sample.

In a further experiment using 2-g. of Reichstein's Substance S, the reaction mixture is cooled and the material which separates is filtered and washed with saturated sodium bicarbonate solution and water and dried to give 1.02 g. of 3-ethylenedioxy-17α,21-dihydroxypregn-5-en-20-one, melting point 220–228° C. The benzene phase of the reaction mixture is treated as described above to give 1.26 g. of solid, melting point 168–195° C. A solution of 20 mg. of this solid in 10 ml. in wet benzene is shaken for one hour with 1.0 g. of anhydrous magnesium sulfate. The filtered solution is evaporated and the residue has an ultraviolet absorption maximum at 241–242 mμ. Comparison of the extinction coefficients before and after treatment indicates that the ketalization proceeded in 96% yield, the ration of $\Delta^5$-3-ketal to $\Delta^4$-ketal being 3 to 1.

EXAMPLE 3

*Preparation of 3-Ethylenedioxy-17α,21-Dihydroxy-6α-Methylpregn-4-En-20-One*

Following the procedure outlined in Example 1, the product of the example is obtained when 17α,21-dihydroxy-6α-methylpregn-4-ene-3,20-dione is substituted for Reichstein's Substance S.

EXAMPLE 4

*Preparation of 3-Ethylenedioxy-17α,21-Dihydroxy-16α-Methylpregn-4-En-20-One*

A further experiment is carried out using the conditions outlined in Example 1. The product identified above is obtained using 17α,2-dihydroxy-16α-methylpregn-4-ene-3,20-dione in place of Reichstein's Substance S.

EXAMPLE 5

*Preparation of 16α, 21-Diacetoxy-3-Ethylenedioxy-17α-Hydroxypregn-4-En-20-One*

Using the conditions outlined in Example 1, the product identified above is obtained from 16α, 21-diacetoxy-17α-hydroxypregn-4-ene-3,20-dione when used in place of Reichstein's Substance S.

EXAMPLE 6

*Preparation of 3-Etheylenedioxypregn-4-En-20-One*

Following the procedure in Example 1 and substituting progesterone for Reichstein's Substance S, a residue is obtained which is crystallized from a small amount of acetone to give 800 mg. of starting material. Concentration of the mother liquor and the addition of petroleum ether gives a further 930 mg. of starting material. On evaporating the mother liquor, 310 mg. of 3-ethylenedioxypregn-4-en-20-one is obtained which contains a small amount of progesterone as shown by infrared absorption spectrum.

EXAMPLE 7

*Preparation of 3-Ethylenedioxypregn-4-En-20-One*

Using the procedure outlined in Example 2 above and substituting progesterone for Reichstein's Substance S, a residue is obtained which is crystallized from acetone-petroleum ether to give 500 mg. of product. Recrystallization gives 283 mg. of 20-ethylenedioxypregn-4-en-3-one, melting point 192–195° C. The oil (2.13 g.) obtained by evaporation of the combined mother liquor is dissolved in about 50 ml. of petroleum-ether and adsorbed on neutral alumina. Fractions of 100 ml. are taken. Fractions 11 and 12 (eluted with 25% ether in petroleum-ether) are evaporated and the residue combined, 780 mg. Crystallization from acetone-petroleum ether gives 530 mg. of 3,20-bisethylenedioxypregn-4-ene, melting point 149–151° C., $[\alpha]_D +88°$ (chloroform).

The material in Fractions 13 and 14 eluted with 25% ether in petroleum-ether totaled 490 mg. and consisted mainly of progesterone and 3-ethylenedioxy-pregn-4-en-20-one as shown by infrared analysis. Hydroylsis of the latter compound either on the column or during evaporation, accounts for the appearance of progesterone at this point. Fractions 15 and 16 (eluted with 25% ether in petroleum-ether) are combined and evaporated and the residue is crystallized from acetone-petroleum ether to give 132 mg. of 3-ethylenedioxypregn-4-en-20-one, melting point 163–165° C., $[\alpha]_D^{30} +175°$ (chloroform). The analytical sample has a melting pont of 164–165.5° C.

Fractions 21–24 eluted with 50% ether in petroleum-ether are evaporated and the residuces combined. Crystallization from acetone-petroleum ether gives an additional 190 mg. of 20-ethylenedioxypregn-4-en-3-one, melting point 195–197° C. Fractions 27–28 eluted with ether are evaporated and the residues combined and crystallized from acetone-petroleum ether to give 38 mg. of progesterone.

EXAMPLE 8

*Preparation of 3,20-Bisethylenedioxypregnane-4ξ,5ξ-Diol*

A solution of 625 mg. of 3,20-bisethylenedioxypregn-4-ene (1.55 mmole) in 5 ml. of pyridine is treated with 415 mg. of osmium tetroxide (1.63 mmole). The reaction mixtuer is stirred at room temperature for 1.5 hours and then allowed to stand in the dark for 12 days. A solution of 900 mg. of sodium bisulfite in 15 ml. of water and 12.5 ml. of pyridine is added and the reaction mixtuer is stirred for 2 hours and 40 minutes. It is then extracted several times with chloroform and the combined extracts are washed with water and dried (with sodium sulfate). Evaporation yields a glass which is dissolved in acetone-petroleum ether and reevaporation gives 675 mg. of white crylstlline solid, melting point 169–174° C., $\mu_{max}$. 3500 cm.$^{-1}$ (no $\Delta^4$-absorption). Recrystallization from acetone-petroleum ether gives 609 mg. of 3,20-bisethylenedioxypregnane-4ξ,5ξ-diol, melting point 169–176° C.

EXAMPLE 9

*Preparation of 4-Hydroxypregn-4-Ene-3,20-Dione*

A solution of 485 mg. of 3,20-bisethylene-dioxypregnane-4ξ,5ξ-diol in 5 ml. of formic acid (98–100%) is heated under reflux for one hour and is then poured into hot water. The mixture is cooled overnight before the material which had separated is collected and washed with water to give 334 mg. of product, melting point 194–215° C. Two crystallizations from acetone-petroleum ether and one from acetone gives 142 mg. of pure 4-hydroxypregn-4-ene-3,20-dione, melting point 229–232° C., $[\alpha]_D +177°$ (chloroform).

EXAMPLE 10

*Preparation of 20-Etheylenedioxypregn-4-En-3-One*

A solution of 20 mg. of 3,20-bisethylene-dioxypregn-4-ene in 10 ml. of wet benzene is shaken for one hour with 1.0 g. of anhydrous magnesium sulfate. The mixture is filtered through diatomaceous earth and the solvent is evaporated. The infrared spectrum of the residue is identical with that of 20-ethylenedioxy-pregn-4-en-3-one. Crystallization of the residue from acetone-petroleum ether gives 8 mg. of product, melting point 189–192.5° C.

EXAMPLE 11

*Preparation of 3-Ethylenedioxypregn-5-En-20-One*

A solution of 400 mg. of 3,20-bisethylenedioxypregn-5-ene in 200 ml. of wet benzene is shaken at room temperature for one hour with 20 g. of anhydrous magnesium sulfate. After filtration through diatomaceous earth and evaporation of the filtrate, the residue (380 mg.) is dissolved in 2 ml. of benzene and 48 ml. of petroleum ether is added. The solution is chromatographed on 30 g. of neutral alumina. Elution with 30% benzene in petroleum ether gives 142 mg. of starting material (shown by the infrared spectrum) followed by 62 mg. of a mixture of starting material and 3-ethylenedioxypregn-5-en-20-one (shown by the infrared spectrum). Continued elution with 30% benzene in petroleum-ether and then with 50% benzene in petroleum-ether gives 167 mg. of material which upon crystallization from acetone-petroleum ether gives 78 mg. of 3-ethylenedioxypregn-5-en-20-one, melting point 182.5–184.5° C.

When the reaction is carried out for 17 hours, chromatography is not required. Thus, the crude residue from 1.0 g. of 3,20-bisethylenedioxypregn-5-ene is crystallized from acetone-petroleum ether to give 670 mg. of 3-ethylenedioxypregn-5-en-20-one, melting point 170–179° C.

EXAMPLE 12

*Preparation of 17α-Acetoxy-3-Ethylenedioxypregn-4-En-20-One*

The product of the example is prepared by substituting 17α-acetoxyprogesterone for Reichstein's Substance S and following the procedure of Example 1.

EXAMPLE 13

*Preparation of 17α-Acetoxy-3-Ethylenedioxy-6α-Methylpregn-4-En-20-One*

The product of the example described above is obtained by using 17α-acetoxy-6α-methylprogesterone in place of Reichstein's Substance S and following the directions of Example 1.

EXAMPLE 14

*Preparation of 3-Ethylenedioxyandrost-4-En-17β-Ol*

A further reaction is carried out in which testosterone is substituted for Reichstein's Substance S and the general procedure of Example 1 is followed. The residual solid obtained having a melting point of 182–221° C. is collected with the aid of ether to give 1.47 g. of solid melting at 217–225° C. Crystallization from acetone gives 1.28 g. of 3-ethylenedioxyandrost-4-en-17β-ol, melting point 224–229° C. Evaporation of the initial ether filtrate followed by crystallization of the residue from acetone gives an additional 70 mg. of product. This mother liquor is evaporated and the residual 670 mg. of solid is dissolved in 30 ml. of benzene and adsorbed on 40 g. of neutral alumina. The material eluted with 10% and 25% in benzene is crystallized in aqueous acetone to give 400 mg. of testosterone.

EXAMPLE 15

*Preparation of 3-Ethylenedioxyandrost-4-En-17β-Ol*

Following the procedure of Example 2 and substituting testosterone in place of Reichstein's Substance S, a residue of 2.29 g. is obtained having a melting point of 156–218° C. The residue is dissolved in 10 ml. of methylene chloride and 5 ml. of ether is added. After standing for one hour at room temperature the material which separates is collected, washed with ether and crystallized from acetone to give 1.14 g. of 3-ethylenedioxyandrost-4-en-17β-ol, melting point 226–230.5° C. An analytical sample has a melting point of 227–232° C. $[\alpha]_D^{30} +100°$ (chloroform).

An additional 100 mg. of product, melting point 193–212° C. is obtained from the initial methylene chloride ether mother liquor by evaporation followed by crystallization from acetone. This mother liquor is evaporated and the residual 860 mg. of solid, melting point 169–175° C. is dissolved in 30 ml. of benzene and adsorbed on 50 g. of neutral alumina. The material eluted with 10% ether in benzene crystallizes from acetone-petroleum ether to give 480 mg. of 3-ethylenedioxyandrost-5-en-17β-ol, melting point 183.5–185.5° C. The material eluted with 25% ether in benzene crystallizes from aqueous acetone to give 74 mg. of testosterone.

EXAMPLE 16

*Preparation of 21-Acetoxy-3-Ethylenedioxy-11β,17α-Dihydroxypregn-4-En-20-One*

Following the procedure of Example 1 and substituting hydrocortisone acetate for Reichstein's Substance S, a residual glass is obtained which is treated with ether and on evaporation gives a solid, melting point 195–210° C., which crystallizes from acetone-petroleum ether containing a small amount of pyridine to give 1.56 g. of 21-acetoxy-3-ethylenedioxy - 11β,17α - dihydroxypregn-4-en-20-one, melting point 212–218° C. An analytical sample has a melting point of 212–217° C. and has $[\alpha]_D +142°$ (1% pyridine in chloroform).

EXAMPLE 17

*Preparation of 21-Acetoxy-3-Ethylenedioxy-11β,17α-Dihydroxy-6α-Methylpregn-4-En-20-One*

This product is obtained by substituting 6α-methylhydrocortisone 21-acetate for Reichstein's Substance S using the conditions outlined in Example 1.

EXAMPLE 18

*Preparation of 21-Acetoxy-3-Ethylenedioxy-11β,17α-Dihydroxy-16α-Methylpregn-4-En-20-One*

The product described above is obtained by substituting 16α-methylhydrocortisone 21-acetate for Reichstein's Substance S and using the conditions outlined in Example 1.

EXAMPLE 19

*Preparation of 16α,21-Diacetoxy-3-Ethylenedioxy-11β,17α-Dihydroxypregn-4-En-20-One*

The product of the example is obtained from 16α-hydroxycortisone 16α,21-diacetate by using the conditions outlined in Example 1.

EXAMPLE 20

*Preparation of 3-Ethylenedioxyandrosta-4,6-Dien-17β-Ol*

Following the procedure of Example 1 and substituting 6-dehydrotestosterone for Reichstein's Substance S, a residue is obtained which is crystallized from acetone-petroleum ether to give 1.93 g. of solid, melting point 156–179° C. The crystallized material and the residue from the mother liquor are combined to give a total of 2.09 g. which is dissolved in 100 ml. of hot benzene. On cooling 1.27 g. of crystals, melting point 193–196° C. separates. The infrared spectrum is identical with the starting material. The benzene filtrate is adsorbed on 108 g. of neutral alumina. The material eluted with 15% ether in benzene is crystallized from acetone-petroleum ether to give 316 mg. of 3-ethylenedioxyandrosta-4,6-dien-17β-ol, melting point 179–181° C., $[\alpha]_D+87°$ (1% pyridine in chloroform). Elution with 20% and 25% ether in benzene gives an additional 540 mg. of starting material.

Hydrolysis of the $\Delta^{4,6}$-3-ketal with perchloric acid in acetone gives 6-dehydrotestosterone, melting point 197–200° C., in high yield.

EXAMPLE 21

*Preparation of 3-Ethylenedioxyandrost-4-En-17-One*

A further experiment is carried out wherein 1 g. of androst-4-ene-3,17-dione is substituted for the Reichstein's Substance S of Example 2 and the procedure of Example 2 followed. The oily residue obtained is dissolved in 50 ml. of 50% benzene in petroleum-ether and adsorbed on 60 g. of neutral alumina. The material (190 mg.) eluted with 50% benzene in petroleum-ether is crystallized from acetone-petroleum ether to give 70 mg. of 3,17-bisethylenedioxyandrost-4-ene, melting point 126–129° C. This compound proved to be unstable on recrystallization (after standing several months) from the same solvents, 17 mg. of 17-ethylenedioxyandrost-4-en-3-one, melting point 146–148° C. being obtained. Further elution with 50% benzene in petroleum-ether and with benzene gives 510 mg. of material from which 340 mg. of 3-ethylenedioxyandrost-4-en-17-one, melting point 141–146° C. is obtained on crystallization from acetone-petroleum ether. An analytical sample has a melting point of 146–148.5° C., $[\alpha]_D+160°$ (1% pyridine in chloroform).

EXAMPLE 22

*Preparation of 21-Acetoxy-3-Ethylenedioxy-17α-Hydroxypregn-4-Ene-11,20-Dione*

When an experiment is carried out following the procedure of Example 1 and substituting cortisone acetate for Reichstein's Substances S, a residue is obtained which on crystallization from acetone containing a trace of pyridine gives 1.64 g. of 21-acetoxy-3-ethylenedioxy-17α-hydroxypregn-4-en-11,20-dione, melting point 231–239° C. Three crystallizations from acetone-petroleum ether containing a trace of pyridine gives 1.19 g. of product, melting point 237–244° C., $[\alpha]_D+159°$ (1% pyridine in chloroform).

EXAMPLE 23

*Preparation of 21-Acetoxy-3-Ethylenedioxy-17α-Hydroxypregn-4-Ene-11,20-Dione*

Following the general procedure of Example 2 and substituting cortisone acetate for Reichstein's Substance S, the reaction mixture is heated under refluxing conditions for 4.5 hours during which time solution takes place followed by separation of the product. The cooled mixture is washed with saturated sodium bicarbonate solution and the solid collected by filtration is washed with water and benzenemethanol (1:1) to give 1.29 g. of 21-acetoxy-3-ethylenedioxy-17α-hydroxypregn - 5 - en - 11,20 - dione, melting point 276–282° C. The infrared spectrum is identical with that of the same compound prepared by a different method. The benzene-methanol wash is evaporated to dryness and the residue is heated with acetone and after cooling is collected by filtration to give an additional 175 mg. of $\Delta^5$-3-ketal, melting point 276–281° C. Concentration of the filtrate and addition of petroleum-ether yields 145 mg. of 21-acetoxy-3-ethylenedioxy-17α-hydroxypregn-4-ene-11,20-dione, melting point 235–246° C. The benzene phase is treated as described in Example 2 and the residue obtained is crystallized from acetone-petroleum ether to give a further 460 mg. of the $\Delta^4$-3-ketal, melting point 237–244° C. The infrared spectrum of these two fractions is identical with that of the product obtained in Example 22.

EXAMPLE 24

*Preparation of 21-Acetoxy-3-Ethylenedioxy-9α-Fluoro-11β,17α-Dihydroxypregn-4-En-20-One*

Following the procedure of Example 1 and substituting 21 - acetoxy - 9α - fluoro - 11β,17α - dihydroxypregn - 4-ene-3,20-dione for Reichstein's Substance S, the combined solvent extracts are dried with sodium sulfate, filtered through diatomaceous earth and evaporated. The residual glass is crystallized from acetone-petroleum ether to give 460 mg. of product, melting point 220° C. (dec.). The diatomaceous earth and sodium sulfate from the above filtration are washed thoroughly with acetone. The crystalline material (1.25 g.), melting point 219–224° C.; 225° C. dec., obtained by removal of solvent is crystallized from acetone-petroleum ether to give 1.06 g. of 21-acetoxy - 3 - ethylenedioxy - 9α - fluoro - 11β,17α - dihydroxypregn-4-en-20-one, melting point 229–232° C.; 233° C., dec. The analytical sample has a melting point of 230–233° C., 234° C. dec., $[\alpha]_D+76°$ (pyridine).

EXAMPLE 25

*Preparation of 21-Acetoxy-3-Ethylenedioxy-9α-Fluoro-11β,17α-Dihydroxypregn-4-En-20-One*

Following the procedure of Example 2, ten grams of 21 - acetoxy - 9α - fluoro - 11β,17α - dihydroxypregn - 4-ene-3,20-dione gives 7.18 g. of 21-acetoxy-3-ethylenedioxy - 9α - fluoro - 11β,17α - dihydroxypregn - 4 - en-20-one, melting point 234–236° C.; 236–239° C. dec.

EXAMPLE 26

*Preparation of 21-Acetoxy-3-Ethylenedioxy-9α-Fluoro-11β,17α-Dihydroxy-6α-Methylpregn-4-En-20-One*

The product described above is obtained from 21-acetoxy - 9α - fluoro - 11β,17α - dihydroxy - 6α - methylpregn-4-ene-3,20-dione by using the conditions outlined in Example 1 and substituting the latter compound for Reichstein's Substance S.

EXAMPLE 27

*Preparation of 21-Acetoxy-3-Ethylenedioxy-9α-Fluoro-11β,17α-Dihydroxy-16α-Methylpregn-4-En-20-One*

The product described above is obtained from 21-acetoxy - 9α - fluoro - 11β,17α - dihydroxy - 16α - methylpregn-4-ene-3,20-dione by using the conditions outlined in Example 1 and substituting the latter compound in place of Reichstein's Substance S.

EXAMPLE 28

*Preparation of 16α,21-Diacetoxy-3-Ethylenedioxy-9α Fluoro-11β,17α-Dihydroxypregn-4-En-20-One*

Following the procedure of Example 1 and substituting 16α,21 - diacetoxy - 9α - fluoro - 11β,17α - dihydroxypregn-4-ene-3,20-dione for Reichstein's Substance S, the residue obtained is crystallized from acetone-petroleum ether to give 1.17 g. of product, melting point 237–245° C.; 246° C. dec. The analytical sample has a melting point of 251–258° C.; 261° C. dec.

EXAMPLE 29

*Preparation of 16α,21 - Diacetoxy - 3 - Ethylenedioxy-9α - Fluoro - 11β,17α - Dihydroxy - 6α - Methylpregn-4-En-20-One*

The product above is obtained from 16α,21-diacetoxy-9α - fluoro - 11β,17α - dihydroxy - 6α - methylpregn - 4-ene-3,20-dione by using the conditions outlined in Example 1.

We claim:
1. A method of preparing steroids having the formula:

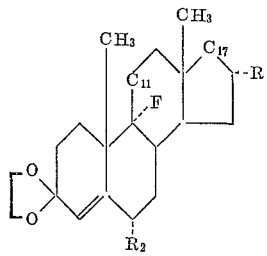

wherein R at $C_{16}$ is a member selected from the group consisting of hydrogen, methyl, hydroxyl and lower alkanoyloxy, $R_2$ at $C_6$ is a member selected from the group consisting of hydrogen and methyl with the proviso that only one of R and $R_2$ can be methyl, $C_{11}$ is selected from the group consisting of

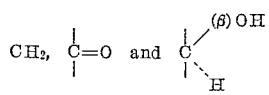

radicals and $C_{17}$ is selected from the group consisting of

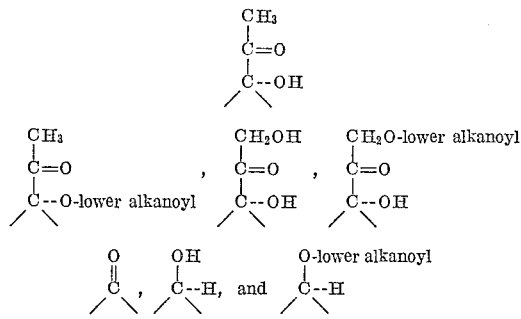

which comprises heating the corresponding 3-ketosteroid with ethylene glycol and an acid having a pKa value within the range of about 1 to about 5 in the presence of a water-immiscible solvent and recovering the 3-ketal steroid therefrom.

2. A method of preparing 3-ethylenedioxy-17α,21-dihydroxypregn-4-en-20-one which comprises heating Reichstein's Substance S with ethylene glycol and adipic acid in benzene until a substantial amount of the 3-ketal is formed and recovering the product therefrom.

3. A method of preparing 3-ethylenedioxypregn-4-en-20-one which comprises heating progesterone with ethylene glycol and adipic acid in benzene until a substantial amount of the 3-ketal is formed and recovering the product therefrom.

4. A method of preparing 3-ethylenedioxyandrost-4-en-17β-ol which comprises heating testosterone with ethylene glycol and adipic acid in the presence of a hydrocarbon solvent until a substantial amount of 3-ketal is formed and recovering said product therefrom.

5. A method of preparing 21-acetoxy-3-ethylenedioxy-11β,17α - dihydroxypregn-4-en-20-one which comprises heating hydrocortisone acetate with ethylene glycol and adipic acid in the presence of a hydrocarbon solvent until a substantial amount of 3-ketal is formed and recovering said product therefrom.

6. A method of preparing 3-ethylenedioxyandrost-4-en-17-one which comprises heating androst-4-ene-3,17-dione with ethylene glycol and oxalic acid in the presence of a hydrocarbon solvent until a substantial amount of 3-ketal is formed and recovering said product therefrom.

7. A method of preparing 21-acetoxy-3-ethylenedioxy-17α-hydroxypregn-4-ene - 11,20-dione which comprises heating cortisone acetate with ethylene glycol and adipic acid in the presence of a hydrocarbon solvent until a substantial amount of 3-ketal is formed and recovering said product therefrom.

8. A steroid having the formula:

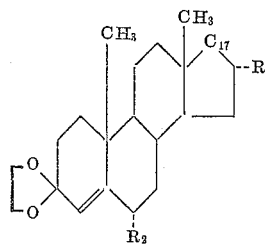

wherein R at $C_{16}$ is a member selected from the group consisting of hydrogen, methyl, hydroxyl and lower alkanoyloxy, $R_2$ at $C_6$ is a member selected from the group consisting of hydrogen and methyl with the proviso that only one of R and $R_2$ can be methyl and $C_{17}$ is selected from the group consisting of

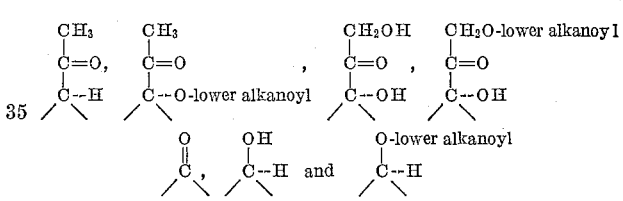

9. The compound 3-ethylenedioxy-17α,21-dihydroxypregn-4-en-20-one.
10. The compound 3-ethylenedioxypregn-4-en-20-one.
11. The compound 3-ethylenedioxyandrost-4-en-17β-ol.
12. The compound 3-ethylenedioxyandrost-4-en-17-one.
13. The compound 17α-acetoxy-3-ethylenedioxypregn-4-en-20-one.
14. The compound 17α-acetoxy-3-ethylenedioxy - 6α-methylpregn-4-en-20-one.
15. The compound 21-acetoxy-3-ethylenedioxy - 11β,17α-dihydroxy-6α-methylpregn-4-en-20-one.
16. The compound 21 - acetoxy-3-ethylenedioxy-9α-fluoro-11β,17α-dihydroxy-6α-methylpregn-4-en-20-one.
17. The compound 21-acetoxy-3-ethylenedioxy - 9α-fluoro-11β,17α-dihydroxy-16α-methylpregn-4-en-20-one.
18. The compound 16α,21-diacetoxy-3-ethylenedioxy-9α-fluoro - 11β,17α-dihydroxy-6α-methylpregn-4-en - 20-one.

References Cited in the file of this patent
UNITED STATES PATENTS 2,997,489    Ringold et al.           Aug. 22, 1961
3,008,960    Patchett              Nov. 14, 1961